(12) United States Patent
Zhang et al.

(10) Patent No.: US 12,418,384 B2
(45) Date of Patent: *Sep. 16, 2025

(54) METHODS AND APPARATUS FOR GENERATING AND USING DYNAMIC PROFILES FOR CABLE TRANSMISSION SYSTEMS

(71) Applicant: ARRIS Enterprises LLC, Horsham, PA (US)

(72) Inventors: Hongbiao Zhang, Westford, MA (US); Chain Lee, Lincoln, MA (US); Yanbo Yuan, Carlisle, MA (US); Tao Yu, Andover, MA (US); Weidong Chen, Boxborough, MA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,096

(22) Filed: Apr. 17, 2024

(65) Prior Publication Data
US 2024/0413957 A1 Dec. 12, 2024

Related U.S. Application Data

(63) Continuation of application No. 18/334,563, filed on Jun. 14, 2023, now Pat. No. 11,997,050, which is a
(Continued)

(51) Int. Cl.
*H04L 5/00* (2006.01)
*H04L 5/02* (2006.01)
*H04L 27/26* (2006.01)

(52) U.S. Cl.
CPC .......... *H04L 5/0092* (2013.01); *H04L 5/0007* (2013.01); *H04L 5/0037* (2013.01);
(Continued)

(58) Field of Classification Search
None
See application file for complete search history.

(56) References Cited

U.S. PATENT DOCUMENTS 11,283,559 B2 * 3/2022 Zhang .................. H04L 5/0092
11,728,956 B2 * 8/2023 Zhang .................. H04L 5/0042
370/329
(Continued)

FOREIGN PATENT DOCUMENTS

JP 2016-517663 A 6/2016

OTHER PUBLICATIONS

Office Action in Japanese Patent Application No. JP 2023-187071, mailed Oct. 15, 2024.

*Primary Examiner* — Diane L Lo
(74) *Attorney, Agent, or Firm* — Chernoff, Vilhauer, McClung & Stenzel, LLP

(57) ABSTRACT

The techniques described herein relate to methods, apparatus, and computer readable media configured to schedule individual orthogonal frequency-division multiple access (OFDMA) resources on an upstream channel to serve a data transmission request from a downstream device. A schedule for a set of available resources on the upstream channel to serve the data transmission request is generated, based on a dynamic bit loading profile, including generating data indicative of a first bit loading profile for a first set of resources from the set of available resources for a first burst, and data indicative of a second bit loading profile for a second set of resources from the set of available resources for a second burst. The schedule is transmitted to a downstream device, such that the downstream device is configured to encode the first burst using the first bit loading profile and the second burst using the second bit loading profile.

9 Claims, 12 Drawing Sheets

Related U.S. Application Data continuation of application No. 17/672,811, filed on Feb. 16, 2022, now Pat. No. 11,728,956, which is a continuation of application No. 16/903,163, filed on Jun. 16, 2020, now Pat. No. 11,283,559.

(60) Provisional application No. 62/862,276, filed on Jun. 17, 2019.

(52) U.S. Cl.
CPC .......... *H04L 5/0044* (2013.01); *H04L 5/0046* (2013.01); *H04L 5/023* (2013.01); *H04L 27/2602* (2013.01)

(56) References Cited

U.S. PATENT DOCUMENTS

| | | |
|---|---|---|
| 11,997,050 B2 * | 5/2024 | Zhang .................. H04L 5/0044 |
| 2015/0288498 A1 | 10/2015 | Kliger et al. |
| 2016/0226739 A1 | 8/2016 | Hamzeh et al. |
| 2018/0076910 A1 | 3/2018 | Zhang et al. |
| 2018/0343033 A1 | 11/2018 | Sun et al. |

* cited by examiner

METHODS AND APPARATUS FOR GENERATING AND USING DYNAMIC PROFILES FOR CABLE TRANSMISSION SYSTEMS

CROSS-REFERENCE TO RELATED APPLICATIONS

This application is a continuation of and claims priority under 35 U.S.C. § 120 to U.S. patent application Ser. No. 18/334,563, filed on Jun. 14, 2023, entitled "METHODS AND APPARATUS FOR GENERATING AND USING DYNAMIC PROFILES FOR CABLE TRANSMISSION SYSTEMS," which is a continuation of and claims priority under 35 U.S.C. § 120 to U.S. patent application Ser. No. 17/672,811, filed on Feb. 16, 2022, entitled "METHODS AND APPARATUS FOR GENERATING AND USING DYNAMIC PROFILES FOR CABLE TRANSMISSION SYSTEMS," which is a continuation of and claims priority under 35 U.S.C. § 120 to U.S. patent application Ser. No. 16/903,163, filed on Jun. 16, 2020, entitled "METHODS AND APPARATUS FOR GENERATING AND USING DYNAMIC PROFILES FOR CABLE TRANSMISSION SYSTEMS," which is a non-provisional that claims the benefit under 35 U.S.C. § 119 (c) of U.S. Provisional Application Ser. No. 62/862,276, filed on Jun. 17, 2019, entitled "METHODS AND APPARATUS FOR GENERATING AND USING DYNAMIC PROFILES FOR CABLE TRANSMISSION SYSTEMS," each of which is incorporated herein by reference in its entirety.

TECHNICAL FIELD

The techniques described herein relate generally to creating dynamic profiles for cable transmission systems, and using such dynamic profiles during scheduling, and in particular to creating and using dynamic profiles for Orthogonal Frequency-Division Multiple Access (OFDMA) transmissions in cable systems.

BACKGROUND OF INVENTION

Multiple generations of standards are used in the industry for cable data transfer. For example, the Data-Over-Cable Service Interface Specifications (DOCSIS) 3.1 is a standard for data transmissions in cable systems that can leverage OFDMA technology for cable upstream data transfer. Different bit-loadings can be used to transmit OFDM symbols. The bit loadings refer to modulation orders in Quadrature Amplitude Modulation (QAM) techniques, such as binary phase shift keying (BPSK), quadrature phase shift keying (QPSK), 8-QAM, 16-QAM, and/or other bit loadings that can be used for OFDM transmissions. Different bit loadings can allow different numbers of bits for each OFDM symbol. For example, QPSK provides two bits per symbol, 16-QAM provides four bits per symbol, while 32-QAM provides five bits per symbol. Bit loadings can include trade-offs. For example, with the same symbol rate, while a lower bit loading provides smaller information rate in terms of bits per second, the transmission is often more reliable since it's more robust against channel impairments.

Profiles can be used to specify a bit-loading pattern that can be used by one or more cable modems (CMs). For example, DOCSIS 3.1 provides OFDMA Upstream Data Profiles for an upstream channel. Each such profile can specify a bit-loading pattern that can be adopted by one or more CMs at a certain time period. Such profile can include information such as an Interval Usage Code (IUC) number (or profile number, e.g., 5, 6, 9, 10, 11, 12, or 13), a bit-loading number for each minislot or consecutive minislots in order in the OFDMA channel (e.g., where the bit-loading number can range from 0 (no transmission) to 12 (4096-QAM)), and/or a pilot pattern index for each minislot or consecutive minislots in order in the OFDMA channel. The profile definitions can be communicated to CMs through Upstream Channel Descriptor (UCD) messages. The assignment of the profiles to a CM could be communicated to the CM using a Transmit Channel Configuration (TCC) in either Registration Response (REG-RSP) or Dynamic Bonding Change (DBC) messages. There is only a limited number (e.g., 2) of OFDMA data profiles that can be supported by a CM.

SUMMARY OF INVENTION

In accordance with the disclosed subject matter, apparatus, systems, and methods are provided for obtaining OFDMA channel performance metrics on a per-resource (e.g., per-minislot) basis for a group of CMs, and for dynamically adjusting bit-loading patterns on a per-resource basis for a group of CMs, with the adjusted bit-loadings immediately adopted by the upstream scheduler without the necessity to communicate with these CMs.

Some embodiments relate to a computerized method for scheduling individual orthogonal frequency-division multiple access (OFDMA) resources on an upstream channel to serve a data transmission request from a downstream device. The method includes generating a schedule for a set of available resources on the upstream channel to serve the data transmission request, based on a dynamic bit loading profile, comprising generating data indicative of a first bit loading profile for a first set of resources from the set of available resources for a first burst, and data indicative of a second bit loading profile for a second set of resources from the set of available resources for a second burst. The method includes transmitting the schedule to a downstream device, such that the downstream device is configured to encode the first burst by encoding the first set of resources using the first bit loading profile and the second burst by encoding the second set of resources using the second bit loading profile.

In some examples, the channel comprises a set of time frames, such as a set of OFDMA frames, each frame comprising an associated set of bursts that includes the first burst, the second burst, and one or more additional bursts, and generating the schedule comprises generating data indicative of a bit loading profile for each burst for each frame from the set of frames.

In some examples, the set of available resources comprises a set of minislots, and generating the schedule comprises generating data indicative of the first bit loading profile for a first set of one or more minislots from the set of minislots for the first burst, and data indicative of the second bit loading profile for a second set of one or more minislots from the set of minislots for the second burst.

In some examples, the method includes individually testing the set of minislots of the channel, using single-minislot grants for each minislot in the set of minislots, to generate performance data for each minislot of the set of minislots, and generating the dynamic bit loading profile based on the performance data. Testing the set of minislots can include grouping downstream devices into a plurality of groups of devices, and collecting performance data for the set of minislots for each group of devices of the plurality of groups of devices, comprising determining a plurality of subsets of minislots of the set of minislots, and collecting performance data for each subset of minislots using a frame of the channel that is different than frames used for other subsets of minislots.

In some examples, the method includes scheduling a non-data transmission request based on the performance data for each minislot of the set of minislots to avoid scheduling the non-data transmission request in one or more of the minislots of the set of minislots with associated performance data indicative of an impairment of the minislot. The non-data transmission request can include a ranging request. Scheduling the ranging request includes determining, based on the performance data for each minislot of the set of minislots, that an existing ranging zone is associated with the one or more minislots with the performance data indicative of an impairment, and determining a new ranging zone based on the performance data.

Some embodiments relate to an apparatus configured to schedule individual orthogonal frequency-division multiple access (OFDMA) resources on an upstream channel to serve a data transmission request from a downstream device. The apparatus includes a processor in communication with memory, the processor being configured to execute instructions stored in the memory that cause the processor to generate a schedule for a set of available resources on the upstream channel to serve the data transmission request, based on a dynamic bit loading profile, comprising generating data indicative of a first bit loading profile for a first set of resources from the set of available resources for a first burst, and data indicative of a second bit loading profile for a second set of resources from the set of available resources for a second burst. The instructions further cause the processor to transmit the schedule to a downstream device, such that the downstream device is configured to encode the first burst by encoding the first set of resources using the first bit loading profile and the second burst by encoding the second set of resources using the second bit loading profile.

In some examples, the channel comprises a set of time frames, such as OFDMA frames, each frame comprising an associated set of bursts that includes the first burst, the second burst, and one or more additional bursts, and generating the schedule comprises generating data indicative of a bit loading profile for each burst for each frame from the set of frames.

In some examples, the set of available resources comprises a set of minislots, and generating the schedule comprises generating data indicative of the first bit loading profile for a first set of one or more minislots from the set of minislots for the first burst, and data indicative of the second bit loading profile for a second set of one or more minislots from the set of minislots for the second burst.

In some examples, the instructions are further configured to cause the processor to individually test the set of minislots of the channel, using single-minislot grants for each minislot in the set of minislots, to generate performance data for each minislot of the set of minislots, and generate the dynamic bit loading profile based on the performance data. Testing the set of minislots can include grouping downstream devices into a plurality of groups of devices, and collecting performance data for the set of minislots for each group of devices of the plurality of groups of devices, comprising determining a plurality of subsets of minislots of the set of minislots, and collecting performance data for each subset of minislots using a frame of the channel that is different than frames used for other subsets of minislots.

In some examples, the instructions are further configured to cause the processor to schedule a non-data transmission request based on the performance data for each minislot of the set of minislots to avoid scheduling the non-data transmission request in one or more of the minislots of the set of minislots with associated performance data indicative of an impairment of the minislot. The non-data transmission request can include a ranging request. Scheduling the ranging request includes determining, based on the performance data for each minislot of the set of minislots, that an existing ranging zone is associated with the one or more minislots with the performance data indicative of an impairment, and determining a new ranging zone based on the performance data.

Some embodiments relate to a non-transitory computer-readable media comprising instructions that, when executed by one or more processors on a computing device, are operable to cause the one or more processors to generate a schedule for a set of available resources on an upstream channel to serve a data transmission request from a downstream device, based on a dynamic bit loading profile, comprising generating data indicative of a first bit loading profile for a first set of resources from the set of available resources for a first burst, and data indicative of a second bit loading profile for a second set of resources from the set of available resources for a second burst. The instructions are operable to cause the one or more processors to transmit the schedule to a downstream device, such that the downstream device is configured to encode the first burst by encoding the first set of resources using the first bit loading profile and the second burst by encoding the second set of resources using the second bit loading profile.

In some examples, the channel comprises a set of time frames, such as OFDMA frames, each frame comprising an associated set of bursts that includes the first burst, the second burst, and one or more additional bursts, and generating the schedule comprises generating data indicative of a bit loading profile for each burst for each frame from the set of frames.

In some examples, the set of available resources comprises a set of minislots, and generating the schedule comprises generating data indicative of the first bit loading profile for a first set of one or more minislots from the set of minislots for the first burst, and data indicative of the second bit loading profile for a second set of one or more minislots from the set of minislots for the second burst.

In some examples, the instructions are further operable to cause the one or more processors to individually test the set of minislots of the channel, using single-minislot grants for each minislot in the set of minislots, to generate performance data for each minislot of the set of minislots; and generate the dynamic bit loading profile based on the performance data. Testing the set of minislots comprises grouping downstream devices into a plurality of groups of devices, and collecting performance data for the set of minislots for each group of devices of the plurality of groups of devices, comprising determining a plurality of subsets of minislots of the set of minislots; and collecting performance data for each subset of minislots using a frame of the channel that is different than frames used for other subsets of minislots.

In some examples, the instructions are further operable to cause the one or more processors to schedule a non-data transmission request based on the performance data for each minislot of the set of minislots to avoid scheduling the non-data transmission request in one or more of the minislots of the set of minislots with associated performance data indicative of an impairment of the minislot. The non-data transmission request can include a ranging request. Scheduling the ranging request includes determining, based on the performance data for each minislot of the set of minislots, that an existing ranging zone is associated with the one or more minislots with the performance data indicative of an impairment, and determining a new ranging zone based on the performance data.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1A:
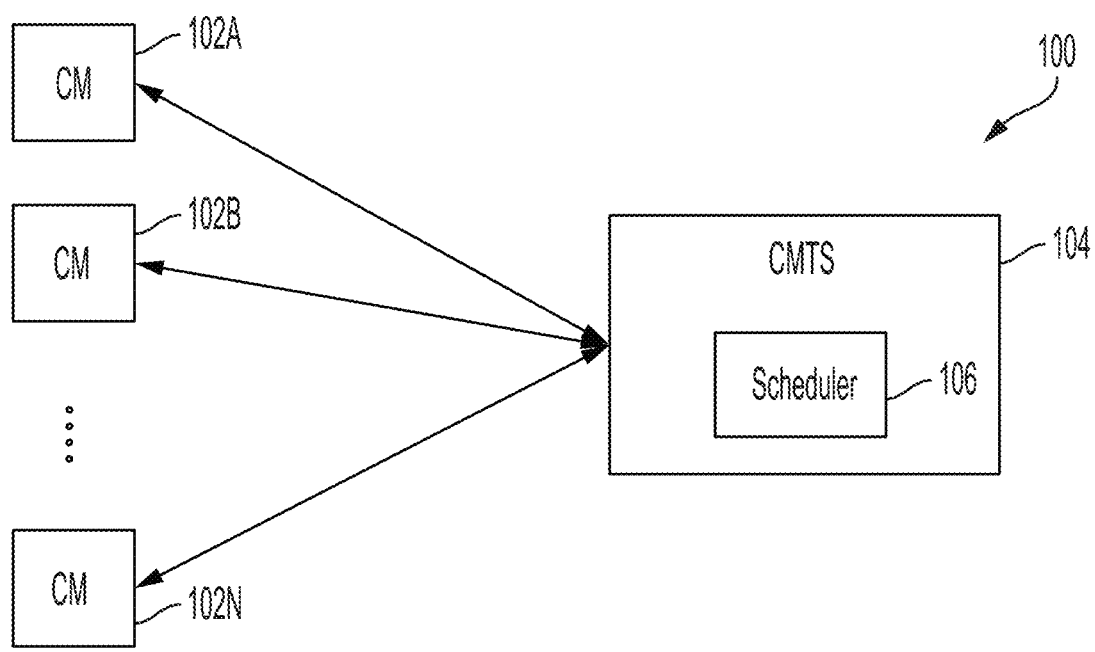
FIG. 1A shows an exemplary configuration of a cable transmission system, according to some embodiments.

The inventors have recognized and appreciated that performance information for OFDMA data transmissions cannot be easily determined at a per-resource level (e.g., per-minislot) from a CMTS burst receiver. Therefore, it can be difficult to determine and/or identify problems in relation to impairments with portions of a channel. The inventors further recognized and appreciated that only a limited number of bit loading profiles are supported by each CM, and it can be time consuming and inefficient to constantly change and/or modify those profiles. Further, the same data profile is typically applied to the same CM across an entire channel at the time of upstream scheduling, such that the bit loadings for individual resources (e.g., minislots) cannot be adjusted quickly enough, such as to compensate for problems with just a portion of the channel.

The inventors have developed techniques to obtain performance information (such as Forward Error Correction (FEC) and Modulation Error (MER) (which can also be referred to as Signal to Noise Ratio (SNR) in cable industry)) at a per-resource level, such as at a per-minislot granularity. The techniques can obtain such performance information by monitoring active data and/or test data, as opposed to relying only on probe signals. In particular, the inventors have recognized limitations with probe signals, such as the facts that probe signals impose additional overhead in channel bandwidth usage, can take a considerably longer time to converge, and may not reflect real-time bursty noise.

The techniques can include obtaining performance measurements by scheduling single resource bursts, such as single-minislot bursts, for transmitting real-time user traffic. For example, the single-minislot bursts can be scheduled with a small percentage of minislots per frame, and in a rotating pattern across the frames, whereas the rest of the minislots in any frame can be utilized for either single-minislot or multi-minislot bursts per normal scheduling procedures, such that performance measurements can be achieved for each minislot over time, and there is little or no overhead in channel utilization (associated with fragmentation of the single minislot bursts). The performance measurements can be obtained for groups of CMs. For example, grouping can be determined based on CMs assigned with the same bit-loading profile(s), per a pre-determined CM profile assignment mechanism. Such groups can, for example, reflect CMs with similar characteristics, such as location, CM type, etc. The performance measurement techniques can include ensuring that there are guaranteed measurement opportunities for each minislot and each CM group in any measurement interval. In some embodiments, in addition to, or instead of, reserving single minislots to measure real-time data, the techniques can include scheduling tests, such as OFDMA Upstream Data Profile (OUDP) Tests on these single minislots. For example, an OUDP Test can be scheduled when a minislot is temporarily excluded of data transmission for a CM group. As another example, an OUDP Test can be scheduled when a minislot is under-sampled using real-time data for a CM group. As a further example, an OUDP Test can be scheduled when a CM group is using a low bit loading and attempts to raise to use a higher bit loading on a minislot.

The inventors have further developed techniques to dynamically adjust bit loadings on a per-resource level. The techniques can leverage bit loading profiles that are currently assigned to a CM (e.g., a high bit loading profile, a low bitloading profile, and no (or NULL) bitloading as a special case) to dynamically adapt to individual resource impairments (e.g., noise conditions), with fast reaction times (e.g., as small as a sub-second). The techniques can include building a dynamic profile that provides different adaptations to use different bit loading profiles (e.g., different portions of a high bit loading profile, a low bitloading profile, and no (or NULL) bitloading) at different minislots. The techniques can include encoding different MAP data Information Elements (IEs) of the same CM with different IUC numbers if the IEs fall into minislots that require different profiles (e.g., where an IE defines each burst for a CM, and a MAP defines all the IEs for all CMs transmitting on this channel during the specified time interval). The dynamic adaptation can be performed locally, for example, by the upstream scheduler, without requiring various messages (e.g., without requiring any MAC Management Message (MMM) messages) to be sent to a CM, which can avoid the CM needing to re-program itself, such as its profile transmission unit. The techniques can allow a cable modem termination system (CMTS) to temporarily exclude impaired regions (e.g., at a minislot level) from being used in scheduling (e.g., scheduling upstream grants, scheduling initial ranging or fine ranging requests), while still utilizing other regions for transmission. The techniques can further allow a CMTS to dynamically move an impaired initial ranging or fine ranging zone to a different region with a better (or the best) performance or a less (or the least) impairment, based on per-minislot performance measurements, such as the per-minislot MER/SNR measurements.

In some embodiments, the techniques include combining dynamic bit-loading adjustment on a per-minislot basis with the existing profile management mechanisms that create and update a CM's profiles, such as its high and low profiles. Such profile management mechanisms can include for example, either algorithms that are executed locally at the CMTS, or a Profile Management Architecture (PMA) that typically uses an external server for calculations. For example, one can use the existing profile management mechanisms to create and assign a high profile and a low profile to a CM, and use the new techniques to create a dynamic profile utilizing the existing high and low profiles, without needing to convey the dynamic profile information to the CM using MMM messages. As a further example, the interval at which the dynamic bit-loading adjustments are made can be much smaller than the interval that are used in the existing profile management mechanisms, as the dynamic bit-loading adjustment is only a local operation.

The dynamic profile adjustment techniques described herein can provide various improvements. For example, being able to adjust bit-loadings on a per-resource level during scheduling can quickly react to dynamic noise conditions, which can improve the overall throughput of the system. As described further herein, existing CM profiles creation, modification and assignment mechanisms do not provide the ability to switch among various profiles on a per-resource basis. Further, changing a CM's profiles is time consuming. The techniques described herein can monitor real-time data measurements to determine how to dynamically adjust each resource to use an optimal bit-loading profile. Further, because existing MMM messaging is not needed to implement the dynamic profile, the dynamic bit-loading techniques can operate much quicker than existing mechanisms, and can co-exist with existing mechanisms.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1A shows an exemplary configuration of a cable transmission system 100, according to some embodiments. The cable transmission system 100 includes a plurality of cable modems (CMS) 102A, 102B through 102N (collectively referred to as CMs 102) that are each in communication with a cable modem termination system (CMTS) 104. Transmissions from the CMs 102 to the CMTS 104 can be referred to as upstream transmissions, while transmissions from the CMTS 104 to the CMs 102 can be referred to as downstream transmissions. The CMTS 104 includes a scheduler 106.

Figure 1B:
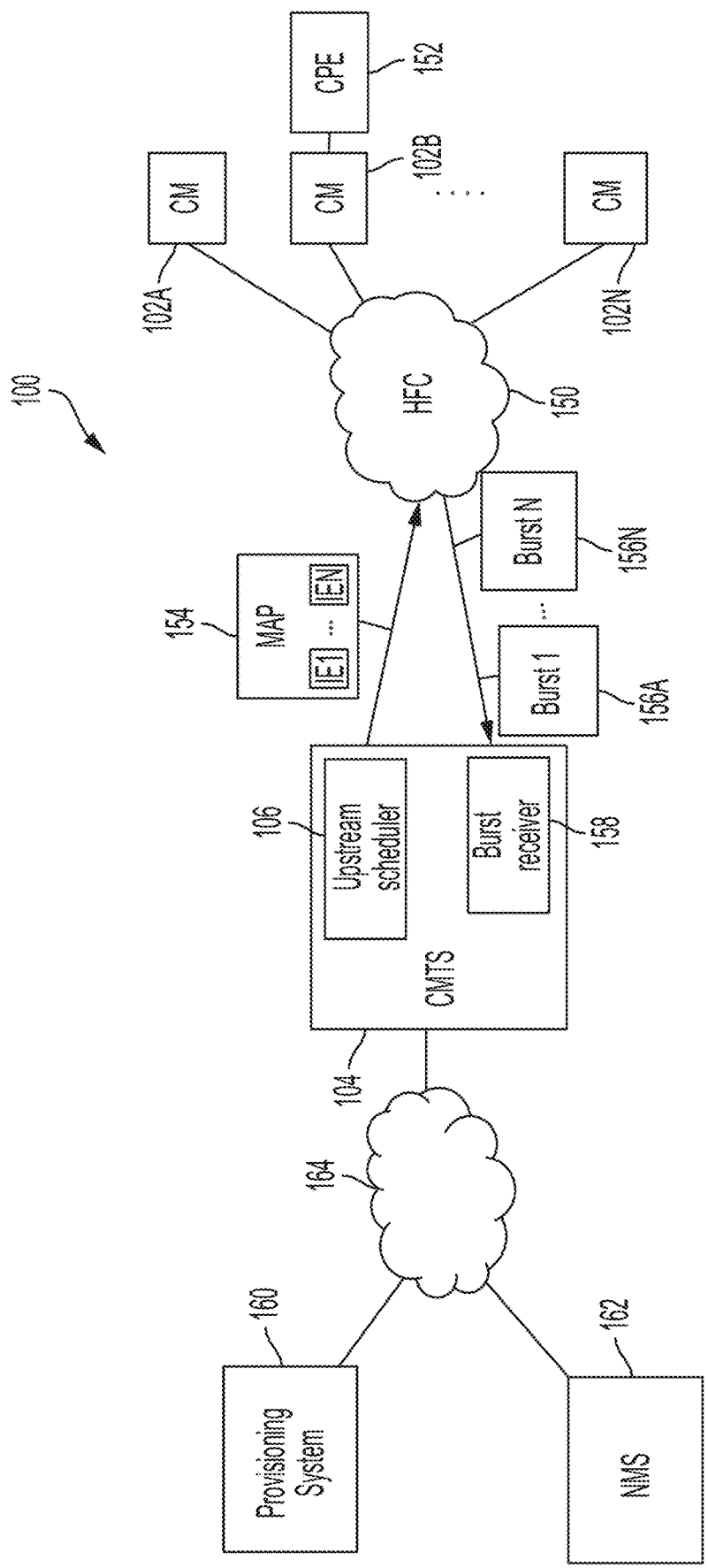
FIG. 1B shows an exemplary detailed configuration of a cable transmission system, according to some embodiments.

FIG. 1B shows an exemplary detailed configuration of the cable transmission system 100 of FIG. 1A, according to some embodiments. Like 1A, the cable transmission system 100 includes the CMs 102, the CMTS 104, and the upstream scheduler 106. While the CMs 102 in FIG. 1A are shown in direct communication with the CMTS 104, this is for illustrative purposes only. It should be appreciated that intermediate connections can be included in the cable transmission system 100 between the CMs 102 and the CMTS 104. For example, thousands or millions of CMs can be in communication with the CMTS via a hybrid fiber coax plant (HFC). FIG. 1B shows CMs 102 in communication with CMTS 104 via HFC 150. While not shown in the diagram, it should be understood that the CMTS 104 could be either an Integrated CMTS (I-CMTS), or a distributed system that comprises of a Converged Cable Access Platform (CCAP) Core and a plurality of Remote PHY Devices (RPDs) using a Distributed Access Architecture (DAA), where the CCAP Core could be either a physical entity or a virtualized entity (i.e., vCCAP).

Each of the CMs 102 can be located at a customer location, such as in a customer's home or in an office building. The customer may have one or more customer premise equipment (CPE) connected to its associated CM 102, such as a home router (e.g., a gateway router), a multimedia terminal adapter (MTA), an analog telephone adapter (ATA), and/or other equipment that can be connected to a CM 102. FIG. 1B shows CM 102B connected to an exemplary CPE 152. The CMs 102 send upstream data bursts to the CMTS 104, shown as burst one 156A through burst N 156N, collectively referred to as bursts 156. The CMTS 104 includes a burst receiver 158 that receives the bursts 156 from the CMs 102.

The CMTS 104 can be connected to various application systems in the back office, including one or more provisioning systems 160 (such as DHCP servers, NTP servers, TFTP servers, etc.), a Network Management System 162 (NMS), Profile Management Application (PMA) services (not shown), and/or the like. The CMTS 104 can be connected to the various application systems through one or more networks 164.

The CMTS scheduler 106 schedules upstream transmissions for all of the CMs 102. In some embodiments, the CMTS scheduler 106 can generate a MAP, which can be used to coordinate multiple access transmissions among the CMs 102. For example, the MAP can specify a series of IEs and each IE can specify information such as a service identifier, an IUC number, and frequency and time segment information (such as the starting minislot number and how many minislots are allocated to this IE, as well as which frame(s) are used for this IE). As shown in FIG. 1B, the upstream scheduler 106 at the CMTS 104 schedules upstream transmission opportunities for Service Flows (SFs) of each of the requesting CMs 102, and constructs MAPs 154 consisting of IEs. The CMTS transmits the MAPs 154 downstream to the CMs 102. Consequently, The CMs 102 send upstream data bursts, e.g., burst one 156A through burst N 156N, to the CMTS, according to the specifications contained in IE 1 through IE N, respectively. The scheduler 106 can periodically send the MAPs out to the CMs 102 (e.g., every 2 milliseconds) to schedule CM 102 transmissions.

Figure 2A:
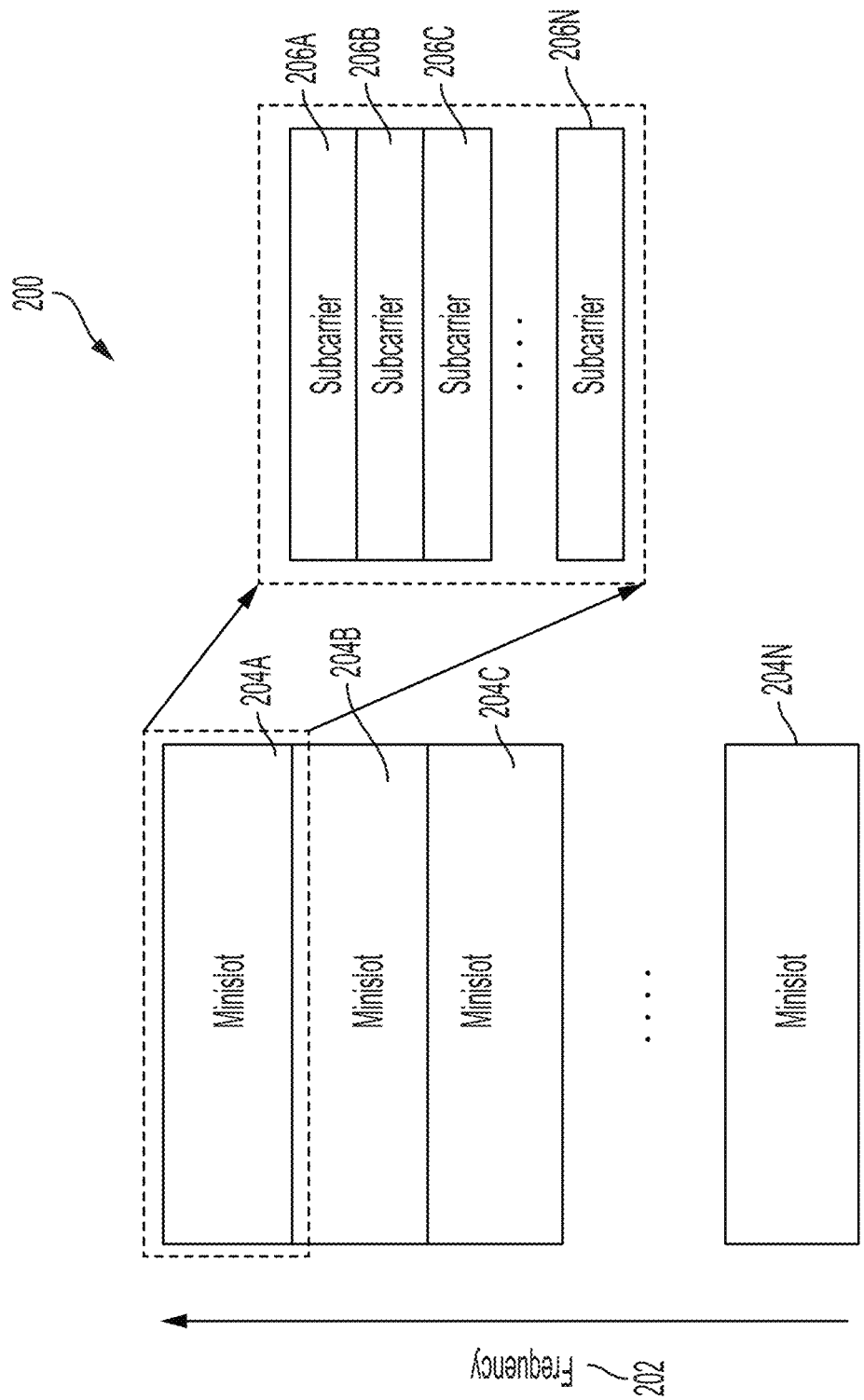
FIG. 2A shows a diagram of the constituent minislots of an OFDMA channel, and the constituent subcarriers of a minislot, according to some embodiments.

FIG. 2A shows a diagram 200 of an upstream channel (partial), according to some embodiments. The upstream frequency span 202 is divided into a plurality of minislots 204A, 204B, 204C, through 204N, which are collectively referred to as minislots 204. Each minislot 204 has a set of dedicated subcarriers. As shown in diagram 200, for example, minislot 204A includes subcarrier 206A, 206B, 206C, through 206N. Each subcarrier is one of a large number of closely spaced (or overlapping) orthogonal narrow-bandwidth data signals within an OFDM channel. A channel can refer to a portion of the electromagnetic spectrum used to convey one or more RF signals (e.g., which can be specified by parameters such as a center frequency, bandwidth, or channel number). As an example, a channel can include up to 96 MHZ.

Figure 2B:
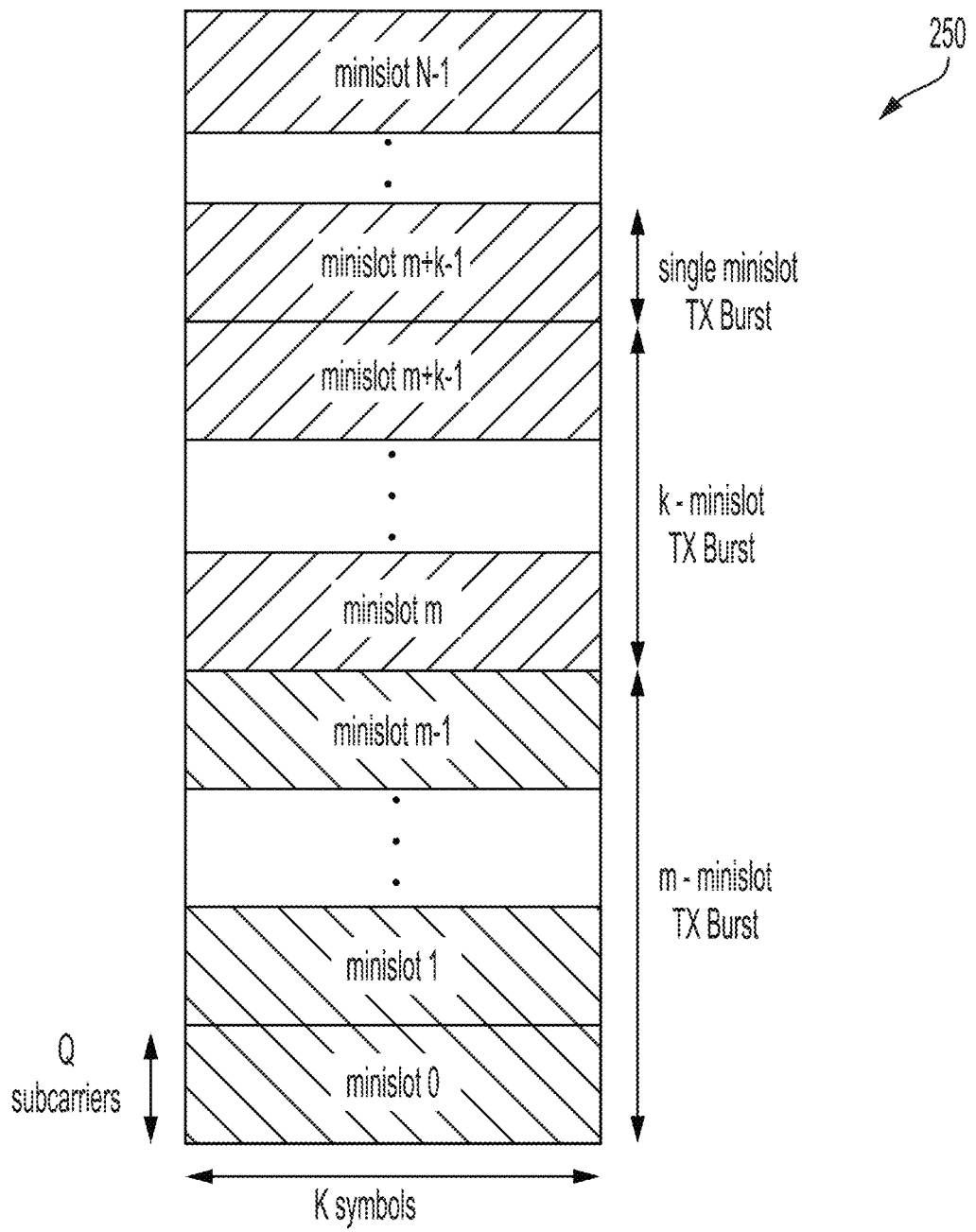
FIG. 2B shows an exemplary OFDMA frame structure, according to some examples.

FIG. 2B shows an exemplary OFDMA frame structure 250, according to some examples. In particular, the example shown in FIG. 2B is taken from FIG. 4 of the DOCSIS 3.1 Physical Layer Specification, CM-SP-PHYv3.1-116-190121. The specification explains that the upstream spectrum of an OFDMA channel is divided into multiple groups of Q subcarriers. Upstream transmission time can be grouped into OFDMA frames, each of which can include K symbols. A minislot is a construct that spans Q subcarriers in frequency domain and one frame (or K symbols) in time domain. For example, Q can be 16 in case of 25 kHz subcarrier (4K FFT) or 8 in case of 50 kHz (2K FFT) depending on configuration. K can be 6 to 36 symbols depending on configuration. All of the subcarriers of a minislot have the same bit-loading. A CM is allocated to transmit one or more minislots in a Transmission Burst (TX Burst). Several CMs can share the same OFDMA frame by transmitting on allocated minislots of the OFDMA frame.

Figure 3:
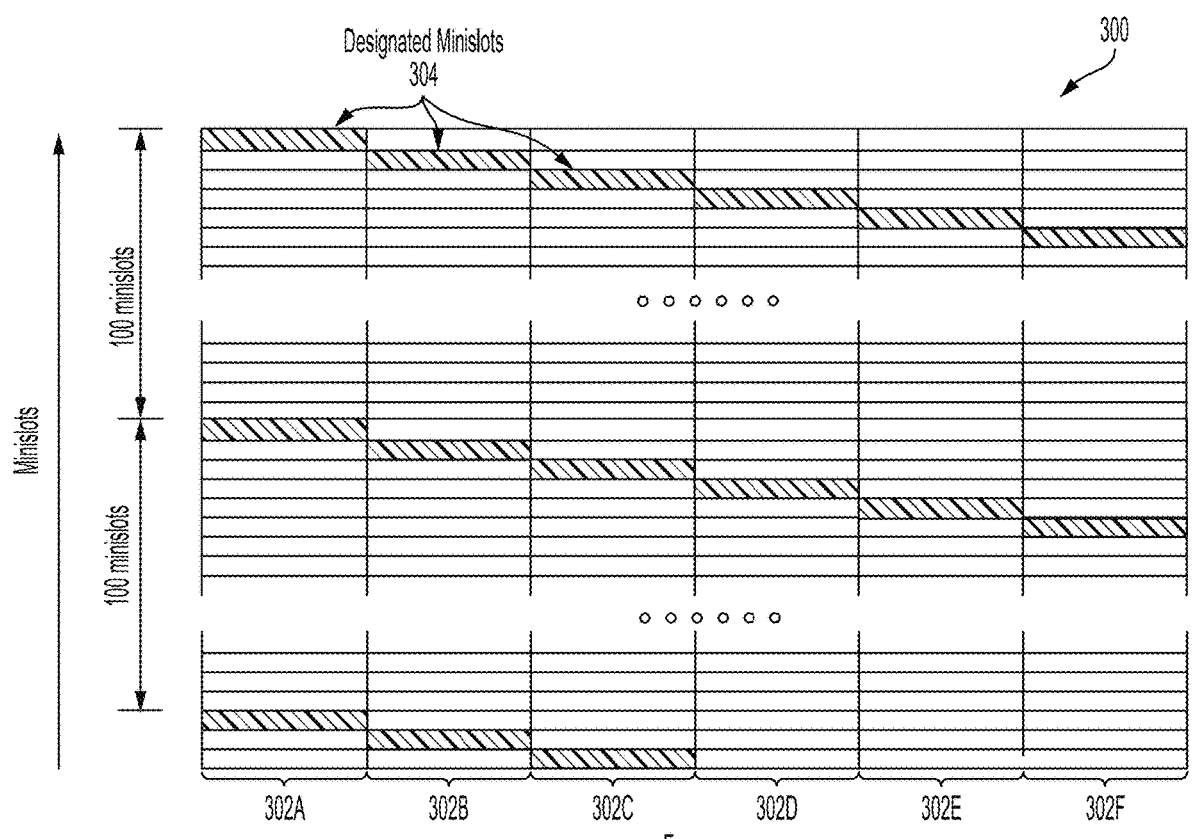
FIG. 3 shows a diagram of OFDMA frames and designated minislots for individual minislot performance measurements, according to some embodiments.

FIG. 3 shows a diagram 300 of OFDMA frames and designated minislots for individual minislot performance measurements within each frame, according to some embodiments. Diagram 300 includes frame 302A, 302B, 302C, 302D, 302E and 302F, collectively referred to as frames 302. As shown in this example, each frame 302 can include a column of minislots across the spectrum of an OFDMA channel.

As described herein, DOCSIS3.1 provides different bit-loadings that can be used for upstream channels. The DOCSIS3.1 Physical Layer Specification is described in, for example, CM-SP-PHYv3.1-116-190121, the DOCSIS3.1 MAC and Upper Layer Protocols Interface Specification is described in, for example, CM-SP-MULPIv3.1-118-190422, which are hereby incorporated by reference herein in their entirety.

Figure 4:
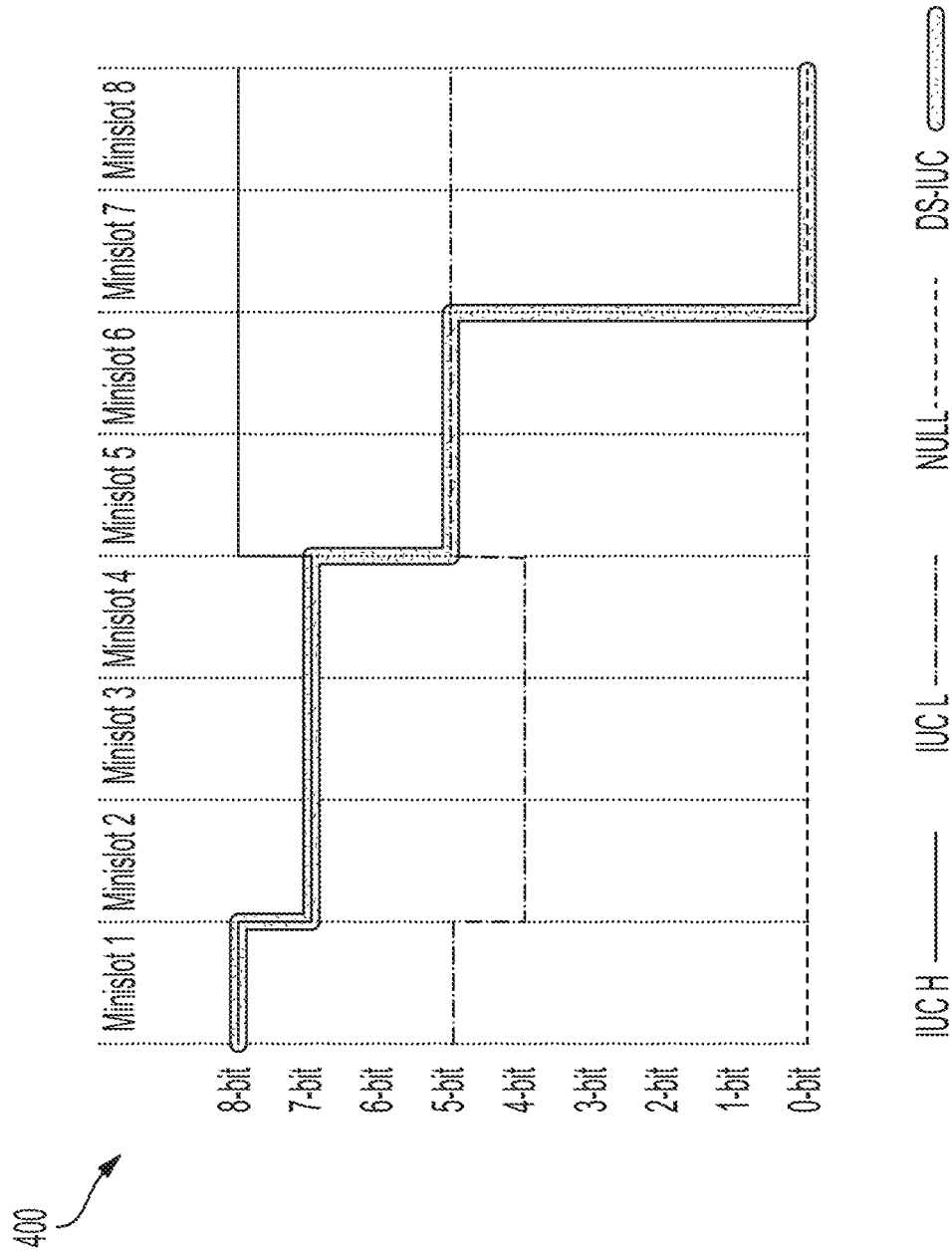
FIG. 4 shows exemplary bit loading profiles, including a high profile, a low profile, and a dynamic profile, according to some embodiments.

FIG. 4 shows exemplary bit loading profiles, including a high profile, a low profile, and a dynamic profile that uses either the high profile or the low profile for different minislots, according to some embodiments. A first profile, shown as IUC H, specifies the following bit-loadings: 8-bit QAM for minislot 1, 7-bit QAM for minislots 2-4, and 8-bit QAM for minislots 5-8. A second profile, shown as IUC L, specifies the following bit-loadings: 5-bit QAM for minislot 1, 4-bit QAM for minislots 2-4, and 5-bit QAM for minislots 5-8. A null bit-loading uses a constant 0 across minislots 1-8 and can be considered a special profile. The CMs and/or CMTS can be configured to start with a higher bit loading to send more data, but if there are errors, the bit loading can be reduced or lowered in order to reliably send data.

Various techniques exist to measure the performance of an upstream channel. For example, one technique is a quiet time probe that can be used to perform carrier-to-noise (CNR) measurement. Quiet probes can be used, for example, as a baseline to generate initial upstream profiles before enabling CMs. Quiet time probe techniques require all subcarriers (including excluded subcarriers) to be probed. As another example, another technique is an active probe that can be used to determine the Receive Modulation Error Ratio (RxMER). An active probe can be used periodically (e.g., at a configurable time interval) after CMs are online. Since probes may not capture bursty noises, they are typically used along with other measurement data. Probes can also take a lot of time to obtain measurements.

As a further example, the modulation error (MER) and/or Forward Error Correction (FEC) can be measured for data transmissions. MER or FEC can be used to determine real-time performance of the data channel. For example, a CMTS burst receiver may determine one or more of the following for each received burst: MER, FEC correctable error count, FEC uncorrectable error count, and/or total codeword count. Another example is the OFDMA Upstream Data Profile (OUDP) Test procedure, which can test a profile currently in use by providing particular grants to the testing CM. The CM will transmit using a specific payload pattern, and the CMTS can use the transmitted pattern for performance measurements, such as determining the FEC errors, the CRC errors, measuring the MER, and/or the like.

The inventors have discovered and appreciated deficiencies with existing performance measurement techniques. For example, while MER and FEC obtained from a burst receiver can be fast indications of channel impairment, they don't pinpoint exact locations of the impairment. Further, a data burst can span many minislots, and therefore MER and FEC are measured against all minislots of the burst since the symbols are interleaved. Existing techniques are therefore not able to obtain performance metrics on a per-resource level, such as on a per-minislot level.

The techniques described herein allow performance measurements (including MER and/or FEC) to be obtained in a way that can generate per-resource (e.g., per-minislot) measurements. The techniques can include providing single resource grants for real-time data whose receptions at the burst receiver can be used for performance measurements. The techniques can further include supplementing the single resource data grants with other testing techniques to ensure each resource is tested (e.g., in the event not enough data is sent on a particular channel to leverage the minislots being examined). The per-resource measurement can be performed on a per CM group basis. Thus, the techniques can derive per-minislot per CM-group performance metrics, in real-time and with no or minimum overhead in bandwidth utilization.

Figure 5:
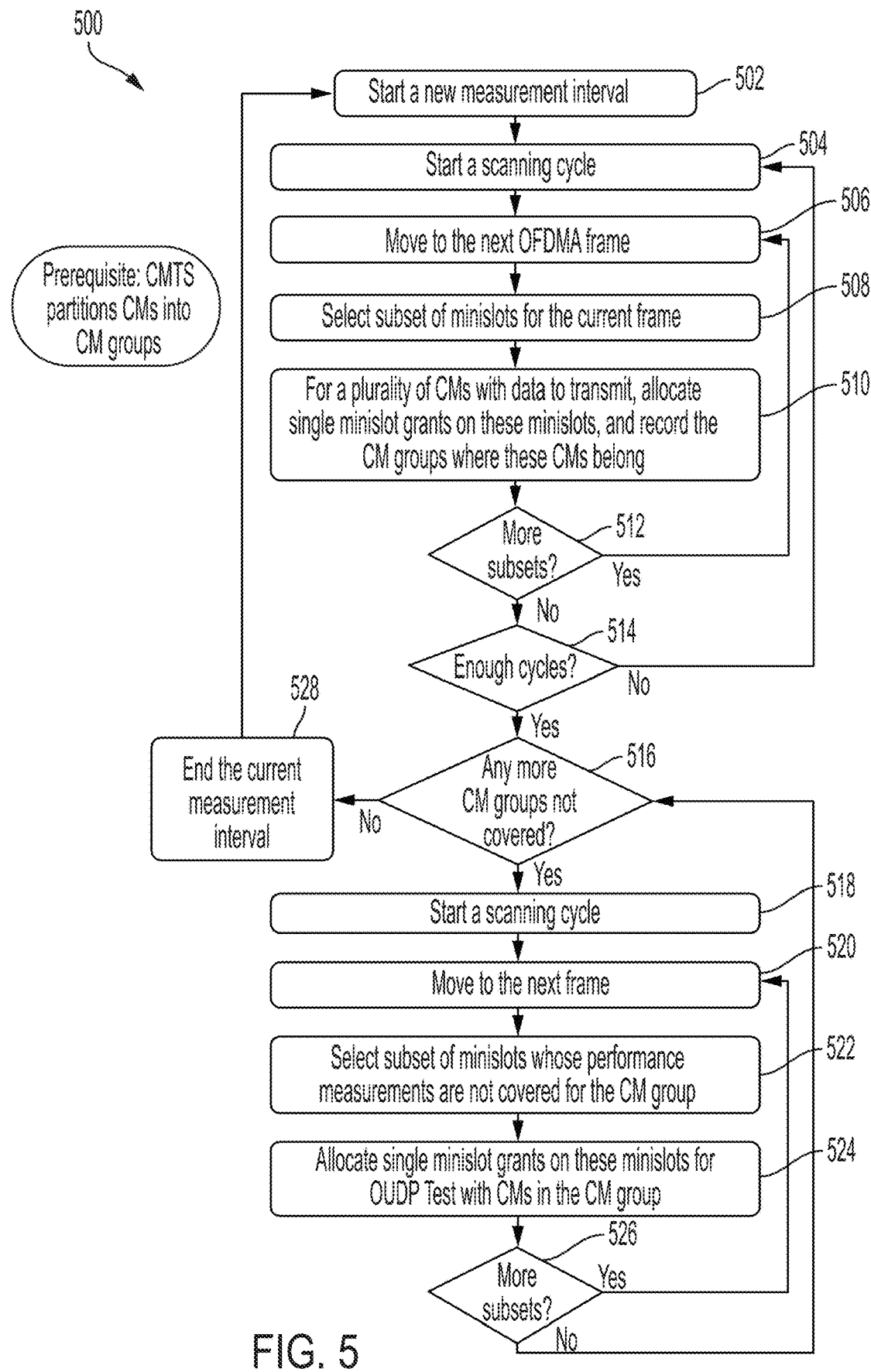
FIG. 5 shows an exemplary computerized method to measure the performance of an upstream channel on a per-minislot basis, according to some embodiments.

FIG. 5 shows an exemplary computerized method 500 to measure the performance of an upstream channel on a per-minislot basis, according to some embodiments. While this example discusses minislots, it should be appreciated that other resources can be measured, such as multiple consecutive minislots. As a prerequisite, the CMTS can partition a plurality of CMs into CM groups. At step 502, the method is started for a new measurement interval. At step 504, the CMTS starts a new scanning cycle. At step 506, the CMTS moves to the next OFDMA frame. At step 508, the CMTS selects a subset of minislots to be measured in the current frame. At step 510, the CMTS allocates single minislot grants on these minislots for a plurality of CMs with data to transmit, and records the CM groups where these CMs belong. At step 512, the CMTS determines whether there are more subsets of minislots that need to be measured. If so, the method proceeds back to step 506, otherwise, it proceeds to step 514. At step 514, the CMTS determines if enough scanning cycles have been used. If not, the method proceeds back to step 504, otherwise it proceeds to step 516. At step 516, the CMTS determines if there's any CM group whose performance measurements of at least one minislot has not been obtained. If yes, the method proceeds to step 518, otherwise it proceeds to end the current measurement interval 528 (and as shown in FIG. 5, the method 500 can proceed back to step 502 for a new measurement interval). At step 518, the CMTS starts a new scanning cycle. At step 520, the CMTS moves to the next OFDMA frame. At step 522, the CMTS selects a subset of minislots where performance measurements are not obtained for the CM group. At step 524, the CMTS allocates single minislot grants on these minislots for OUDP Test, with the testing CMs from within the CM group. At step 526, the CMTS determines if there are more subset of minislots whose performance measurement are not obtained for the CM group. If so, the method proceeds back to step 520, otherwise it proceeds back to step 516.

As a prerequisite prior to the step 502, the CMTS can partition the plurality of CMs into CM groups so that all CMs in a particular CM group have similar performance measurements, such as similar impairments in each sub-band of the channel, where the differences in performance measurements among the different CM groups can be a reflection of different CM vendors and types, or due to different physical segments of the cable plant where they are located. In some embodiments, the CMTS can be configured to group CMs using various rules, depending on deployment scenarios and implementation specifics. For example, if the CMTS determines that there are only a few CMs connected to the CMTS, the CMTS can categorize each CM to a separate CM group. As another example, if the CMTS determines that all CMs on the upstream channel behave uniformly (e.g., across minislots over time), the CMTS can categorize all of the CMs into the same CM group. As yet another example, the CMTS categorizes the CMs that are assigned with the same high profile and low profile into the same CM group, as the CMs that were assigned with the same high and low profiles (per the existing profile management mechanisms) can suggest that the CMs have similar performance. If a CM in a particular group is re-assigned with a different profile (e.g., a different high or low profile per the existing mechanisms), the CMTS can move the CM to a different CM group that includes CMs with the different profile.

Refer to step 510 and step 524, the CMTS allocates single minislot grants on the selected subset of minislots (as determined in the previous step) for data transmissions and OUDP Test respectively. Meanwhile, the CMTS also attempts to allocate single-minislot or multi-minislot grants on the rest of the minislots of the current frame for real-time data of the requesting CMs, per the normal scheduling procedures. If there're still remaining minislots that are not allocated, the CMTS may again allocate single minislot grants on these remaining ones for OUDP Test. Such procedures are not illustrated in the diagram for simplicity.

Referring further to steps 504-514. As discussed herein, the CMTS burst receiver can collect various performance information, such as FEC correctable count, FEC uncorrectable count, total word count, and MER for each received burst. However, when errors are detected with the received burst and the burst size is more than a minislot, the CMTS cannot determine which minislot contributed to the impairment. To allow the CMTS to obtain performance metrics on per-minislot granularity, the CMTS can designate some minislots in each frame to be used for one-minislot grants. For example, the CMTS can designate a pre-defined percentage of one-minislot grants for each frame. Referring to FIG. 3, the CMTS designates a one-minislot grant 304 in every 100 minislots of each frame 302. As shown in FIG. 3, the position of the designated minislots 304 can rotate in each frame, such that in frame 302A the top-most minislot is granted, in frame 302B, the next-highest minislot is granted, and so on. By rotating the designated minislots across frames, each minislot can be scanned over time with the same frequency. For example, if the CMTS designates 1% of minislots in a frame to be used for single minislot grants, it takes 100 frames to scan through every minislot (the scanning cycle is 100 frames). Depending on the frame size (e.g., 6-36 symbols) and Cyclic Prefix (CP) values, there could be anywhere from approximately 1000-8000 frames in a second. If there are 3000 frames in a second, for example, any particular minislot will be scanned 30 times in a second, including single-minislot grants at this location assigned to any of the CM groups. The 1 second can be chosen as a measurement interval.

The CMTS can thus determine real-time data performance metrics for each allocated minislot. For example, since the grants are single minislots, signals of this minislot are not interleaved with other minislots. Therefore, the CMTS can determine performance metrics that the CMTS knows are attributable to just the particular minislot under examination. The techniques can therefore use real-time data for measurement by scheduling single-minislot grants, such that the CMs transmit the data using single-minislot bursts at the designated positions. Other than these positions, data is still scheduled with single or multiple minislot grants just the same as before.

The CMTS can tally minislot performance metrics for each group. For example, when the CMTS receives a single minislot burst from a CM (a burst associated with a single-minislot grant), the CMTS can measure the burst and count the performance metrics toward the group which the transmitting CM belongs to. The CMTS can separately maintain each measured performance metric. For example, the CMTS can maintain correctable and/or uncorrectable FEC metrics on a per-group, per-minislot basis (e.g., uFEC_<group, minislot>, cFEC_<group, minislot>, etc.), MER metrics on a per-group, per-minislot basis (e.g., MER_<group, minislot>), etc.

Refer to steps 516-526. In some embodiments, the CMTS can be configured to avoid under-sampling minislots for the various CM groups. For example, in a situation with multiple active CM groups, it may not be known (e.g., due to some randomness) how often a particular CM group could be scanned for every minislot. Some CM groups could be under-sampled on some minislots, even if there is active data for the CM group. To avoid under-sampling minislots, the CMTS can reserve some opportunities (e.g., out of all opportunities that will be scanned for each minislot in a measurement interval) for test grants. For example, the CMTS can reserve some opportunities for OUDP Test.

Figure 6:
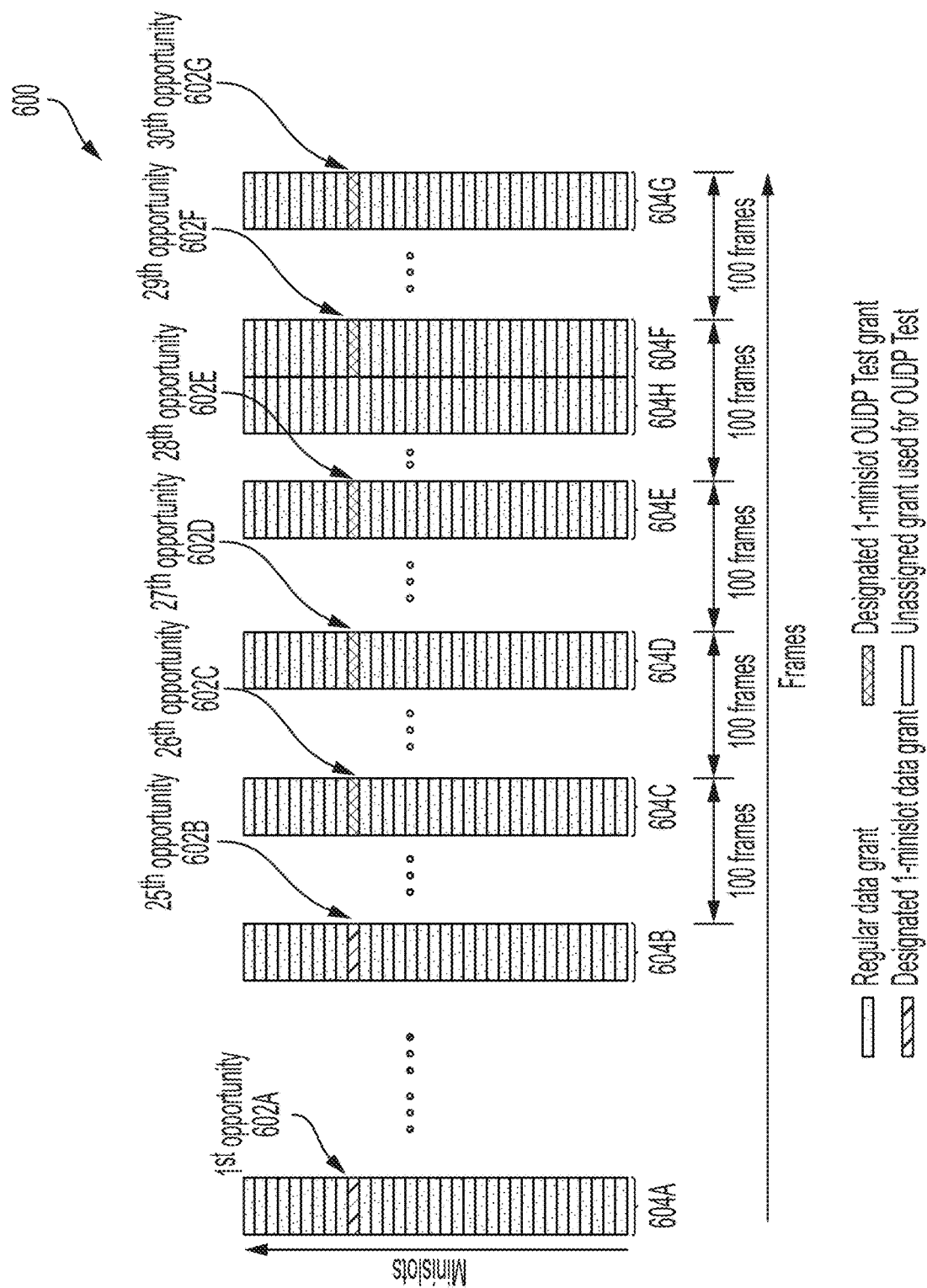
FIG. 6 shows a diagram of reserved opportunities for performance measurements using test data, according to some embodiments.

FIG. 6 shows an exemplary diagram 600 of reserved opportunities for test grants, according to some embodiments. In the example, there are 5 CM groups all together. Further, with 1% of minislots of a frame designated for one-minislot grants, and with 3,000 frames per second, that would result in 30 opportunities for each minislot to be scanned per second, each spaced by 100 frames. As shown in FIG. 6, the CMTS has 30 opportunities for each minislot to be scanned in a one-second interval (one opportunity in each scanning cycle), including the $1^{st}$ opportunity 602A in frame 604A, ..., the $25^{th}$ opportunity 602B in frame 604B, the $26^{th}$ opportunity 602C in frame 604C, the $27^{th}$ opportunity 602D in frame 604D, the $28^{th}$ opportunity 602E in frame 604E, the $29^{th}$ opportunity 602F in frame 604F, and the $30^{th}$ opportunity 602G in frame 604G. The CMTS in the example in FIG. 6 is configured to use the first 25 opportunities for single-minislot data grants, as shown for the $1^{st}$ opportunity 602A in frame 604A up till the $25^{th}$ opportunity 602B in frame 604B. The CMTS is configured to reserve the remaining 5 opportunities for OUDP Test, one opportunity for each CM group, as shown for the $26^{th}$ opportunity 602C in frame 604C, the $27^{th}$ opportunity 602D in frame 604D, the $28^{th}$ opportunity 602E in frame 604E, the $29^{th}$ opportunity 602F in frame 604F, and the $30^{th}$ opportunity 602G in frame 604G. While the CMTS reserves these 5 opportunities, the CMTS needs not use the reserved opportunities for OUDP Test (e.g., as opposed to data grants). For example, as described herein, the CMTS may only use the opportunities for minislots that were not yet scanned in the first 25 grants. Such an exemplary approach yields to at most 5/30/100=0.167% overhead to reserve slots for OUDP test. By reserving one or more opportunities for test grants, the CMTS can ensure that, in each measurement interval, each minislot has at least one opportunity to be measured for each CM group.

In some embodiments, any unused minislot in a frame can be added to the pool of OUDP Test opportunities for that minislot. For example, if there are unassigned minislots in a frame, the scheduler could utilize any of them for a single-minislot OUDP Test grant, without being restricted to the designated locations. Such a minislot can be added into the reserved OUDP Test opportunities (e.g., five are reserved in the above example) for that minislot to cycle through each CM group. An example of such a minislot is shown in frame 604H, which is a frame that precedes frame 604F. Such unused minislots can provide more opportunities for measurements without additional cost, since the bandwidth would otherwise be wasted anyways.

The techniques used to assign OUDP Test opportunities to CMs and/or to perform an OUDP Test can be configured based on deployment scenarios and implementation specifics. For example, OUDP Test can require a specific service ID (SID) per CM that is assigned to the CM being tested. In some embodiments, based on the total number of SIDs needed in the particular customer deployment for OUDP Test, the CMTS can be configured to use different techniques for SID assignment. For example, the CMTS can be configured to choose an unused SID and assign it to the CM being tested on the fly when it becomes necessary. As another example, the CMTS may be configured to pre-assign a unique OUDP Test SID to each CM at CM registration time. As a further example, the CMTS may pre-assign some OUDP Test SIDs to a group of CMs, and cycle through these SIDs to reuse them with another group of CMs whenever necessary.

There have been various discussions and approaches for OFDMA profile management. For example, the DOCSIS 3.1, CCAP™ Operations Support System Interface Specification, CM-SP-CCAP-OSSIv3.1-I11-171220, describes a method for an operator to statically configure a set of OFDMA profiles used by DOCSIS 3.1 CMs on an OFDMA channel.

As other examples, there exist mechanisms that allow the CMTS to create data profiles used by DOCSIS 3.1 CMs on an OFDMA channel based on performance measurement of these CMs, primarily RxMER. There also exist some mechanisms that address how to assign and periodically re-assign data profiles to a CM in reaction to channel impairment, with the CMTS constantly monitoring the performance metrics of the CM.

The DOCSIS® 3.1 Profile Management Application Technical Report, CM-TR-PMA-V01-180530, describes an architecture using an external PMA server. The PMA server constantly monitors the upstream spectrum, by initiating RxMER measurement for upstream subcarriers (using quiet or active probes), or triggering OUDP Test, both through the CMTS. The PMA could also utilize information from other tests, such as upstream captures from a PNM server, as well as historical information obtained on the plant. With such, the PMA server is able to evaluate the current upstream channel's performance and generate a set of data profiles for the channel. Meanwhile, the PMA server may also designate one or two of these profiles to each CM on this channel.

The inventors have discovered and appreciated deficiencies with existing profile management techniques, including existing bit-loading profiles and their use. While a CM can be configured with multiple bit-loading profiles (also referred to as data IUCs herein), typically a CM is instructed by the CMTS to always use a particular bit-loading profile for all data bursts for each channel at each scheduling cycle. For example, in each MAP interval, the CM will use only one profile for all of the minislots for all bursts of data transmission. Further, while a CM may store a high profile and a low profile, the CM does not know when to use either the high or low profile. Instead, the CMTS will choose the high profile for the CM until it detects error measurements, and then the CMTS may switch to the low profile for the CM. After switching profiles, the CMTS chooses the low profile for the CM for all data bursts of this channel.

The inventors have also discovered and appreciated that existing profile management techniques require changing the content of the profile (e.g., by either changing the content of an assigned profile, or change the profile assignment) and communicating the modified profile to the applicable CMs. Such techniques take time to make profile changes to the CMs, and the CM typically must receive the modified profiles and perform a number of steps to be able to use the profile, such as reprogramming the hardware each time a CM receives a modified profile. Existing techniques also typically only support a limited number of profiles for an OFDMA channel and each CM, such as just 1 or 2 IUCs for each channel. Further, one of the profiles is typically the lowest bit-loading profile (e.g., IUC 13) that is required for pre-registration. Therefore, the mechanisms above require the CMTS to constantly communicate with the corresponding CMs using UCD and/or DBC messages because if the CMTS wants to change profiles, the CMTS needs to send out messages since each CM can only store two profiles. The communication overhead needed for such profile management can negatively impact the system, such as limiting how fast the profile management functions can run, and/or limiting how quickly a CMTS system can adapt to channel impairment. To limit the overhead, a time interval can be configured or followed to set how often the CMTS (or the Profile Management Application (PMA) server) evaluates the current profiles assigned to each CM to modify or re-assign the profiles, as necessary. An operator may define a time interval, which determines how often the CMTS (or the PMA server) evaluates the current profiles assigned to each CM and performs modification or re-assignment of these profiles if necessary. These mechanisms are referred to in general herein as profile management mechanisms, and this interval is generally referred to as the profile management interval.

The techniques described herein can be used to dynamically adjust how a CM modulates its upstream transmissions on an OFDMA channel. The techniques can include dynamically switching the bit loadings for the OFDMA channel using a locally orchestrated bit-loading profile. The profile can leverage, at per-minislot granularity, different bit-loading profiles (e.g., portions of the high profile or low profile (also referred to as IUC H and IUC L, respectively), or null profile). The techniques can create and/or adjust the profile in reaction to real-time noise in a manner that is faster than existing techniques without needing to notify the CMs of new or modified profiles. For example, the CMTS can switch the bitloading on a few minislots when the CMTS determines there is an impairment only within a sub-band of a channel. The techniques can allow a CMTS to dynamically toggle between the profiles assigned to the CM. For example, in a smaller time interval (referred to as a dynamic profile interval) than the profile management interval, the CMTS scheduler can dynamically toggle between IUC H, IUC L and NULL bit-loadings at per resource, such as per minislot level. The CMTS scheduler can perform such dynamic toggling without communicating to the CM through the traditional paths (e.g., MMM messages) as used in profile management mechanisms. The new technique is thus loosely referred to as dynamic profile, or sometimes referred to dynamic scheduling profile (or dynamic scheduling IUC, or DS-IUC in short), as the profile can be generated and used locally, for example, by the CMTS scheduler.

Figure 7A:
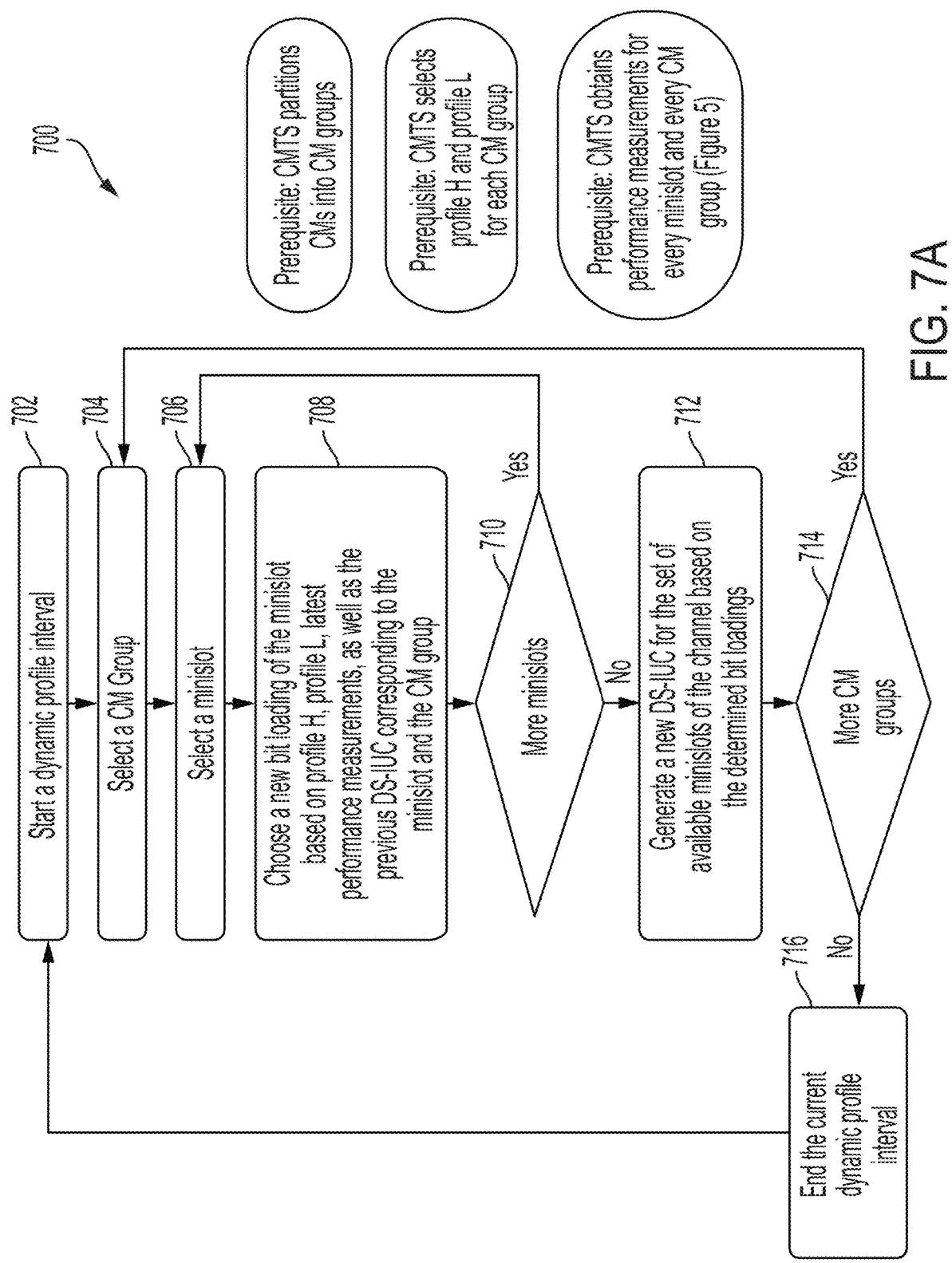
FIG. 7A shows an example of a computerized process to generate bit-loadings for resources (e.g., minislots), according to some embodiments.

FIG. 7A shows an example of a computerized process 700 to generate bit-loadings for resources (e.g., minislots), according to some embodiments. At step 702, the method is started for a new dynamic profile interval. At step 704, the CMTS selects a CM group to analyze for bit loadings. At step 706, the CMTS selects a resource (e.g., minislot) to analyze the bit loading. At step 708, the CMTS determines the new bit-loading of the resource based on portions of profile H, profile L, the latest performance measurements as well as the previous dynamic scheduling profile corresponding to the resource and the CM group being analyzed. At step 710, the CMTS determines if there're more resources to be analyzed. If so it proceeds back to step 706, otherwise it proceeds to step 712. At step 712, the CMTS generates a new dynamic scheduling profile using the bit loadings obtained for all the resources. At step 714, the CMTS determines if there're more CM groups to be analyzed. If so it proceeds back to step 704, otherwise the method is ended for the current dynamic profile interval 716 (and as shown in FIG. 7A, the method can proceed back to step 702 for a new dynamic profile interval).

As a prerequisite prior to step 702, the CMTS can partition a plurality of CMs into CM groups, as previously explained. As another prerequisite, the CMTS selects profile H and profile L for each CM group, based on existing profile management mechanisms, as previously explained. As yet another prerequisite, the CMTS obtains performance measurements for each resource and each CM group, as shown in FIG. 5 and explained previously.

Figure 8:
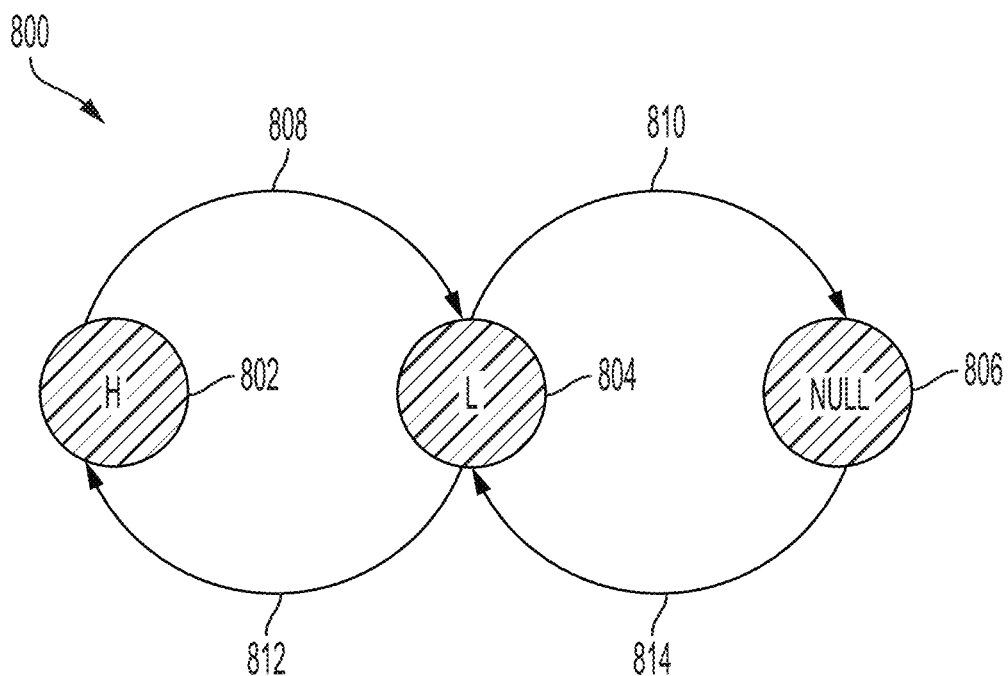
FIG. 8 is a state transition diagram of an exemplary process for calculating bit loadings for each resource (e.g., minislot), according to some embodiments.

Referring to step 708, the CMTS can determine the new bit loading using per-resource (e.g., per-minislot) performance data, as described herein. FIG. 8 is a state transition diagram of an exemplary process 800 for calculating the new bit loading for each resource and each CM group, according to some embodiments. For this example, we will assume that for each minislot and each CM group there exists three possible bit loading states: high (H) 802, low (L) 804, and NULL 806. State H means the bit loading at the particular minislot assumes as that of IUC H, i.e., bit-loading_<H, minislot>. State L means the bit loading at the particular minislot assumes that of IUC L, i.e., bit-loading_<L, minislot>. State NULL means the bit loading at the particular minislot is 0. Further, there are four transitions: transition 808 (H 802→L 804), transition 810 (L 804→NULL 806), transition 812 (L 804→H 802), and transition 814 (NULL 806→L 804). As a general matter, the CMTS can start with the H 802 bit loading until detecting errors, at which point the CMTS may transition to using the L 804 bit loading. The CMTS can analyze performance data, as discussed further herein, to determine when to transition from one state to another state.

In some embodiments, the CMTS can be configured to evaluate conditions to trigger a state transition using various techniques. For example, transition 808 may be triggered when the uFEC of the minislot (e.g., determined on a group basis, as described herein) exceeds a predetermined threshold. The predetermined threshold can be, for example, an uncorrectable FEC error threshold in percentage beyond which transition 808 would occur (e.g., when switching from the high profile to the low profile). For example, the predetermined threshold can range from 0.1% to 1%, e.g., per operators' discretion. The uFEC can be determined based on performance measurements of IUC H in the previous measurement interval. In some embodiments, the CMTS can record the MER of the minislot at this moment as tSNR (e.g., where tSNR is the MER/SNR recorded for the minislot when transition 808 occurs). As another example, transition 810 may be triggered when the uFEC of the minislot for the group exceeds a predetermined threshold. The predetermined threshold can be the uncorrectable FEC error threshold in percentage beyond which transition 810 would occur (e.g., when switching from the low profile to NULL bit loading). The uFEC can be determined based on measurement of IUC L in the previous measurement interval. As a further example, transition 812 may be triggered when there is no FEC error and MER is above a threshold, considering both the absolute reference number and the history of previous transitions. For example, transition 812 may be triggered when all of the following conditions hold: (a) the MER of the minislot for the group is above the sum of tSNR for the minislot and Mdb, (b) MER is above rSNR, and (c) the sum of cFEC and uFEC is 0. Mdb can be the marginal DB that has to be added on to the tSNR in 808, in order to evaluate whether transition 808 can be reversed (e.g., via transition 812). The choice of this configurable margin can control how aggressively to allow state transition between H and L to occur. The rSNR can be the reference SNR associated with bit-loading_<H, minislot>. The performance values used for transition 812 can be determined based on measurements of IUC L in a previous set of intervals. As a further example, transition 814 can be triggered when all of the following conditions hold: (a) uFEC is 0, (b) cFEC is below a predetermined threshold, and (c) MER exceeds rSNR. The predetermined threshold can be the correctable FEC error threshold in percentage below which transition 814 would occur. The rSNR can be the reference SNR associated with the bit-loading_<L, minislot>. In some embodiments, the performance measurements used for transition 814 can be determined based on OUDP Test with IUC L in a previous set of intervals.

The standard allows an OUDP Test grant to be configured to operate similar to a data grant, but where the CM sends test data instead of real data at the identified minislot(s), using a profile identified by the CMTS, which was previously assigned to the CM. In some embodiments, the CMTS may be configured to use OUDP Test in various ways. For example, the CMTS can be configured such that if a minislot is in a NULL state for a particular CM group, then the measurement opportunity for that group will be used for an OUDP Test with the target low profile. This configuration can be used to test for the conditions for transitioning out of NULL state, such as to test for Transition 814 in FIG. 8. As another example, if a minislot is in a state using a particular profile (e.g., profile H or profile L) for a particular CM group, then the opportunity for that group will be used for OUDP Test with the current profile. As a further example, if a minislot is in a state using a particular profile (e.g., profile L) for a particular CM group, the CMTS may choose to use the opportunity for that group to perform OUDP Test with a higher profile (e.g., profile H). This can be used to test for the conditions for transitioning from a lower profile to a higher profile, such as to test for Transition 812 in FIG. 8.

Referring to step 712, to adjust bit-loadings on a minislot basis, the CMTS can periodically generate a dynamic profile. For example, the CMTS can generate a Dynamic Scheduling IUC (DS-IUC, which is used to describe the techniques but is not intended to be limiting as any profile name can be used without departing from the spirit of the techniques described herein). The DS-IUC can adopt one of the available profiles at a CM (e.g., IUC H, or IUC L, or NULL) on a minislot-by-minislot basis. Referring to FIG. 4, for example, the DS-IUC adopts IUC H in minislot 1-4, but adopts IUC L in minislot 5 and 6, and again adopts a NULL bitloading in minislots 7-8. Therefore the bit loadings of the DS-IUC is defined as: 8-bit QAM for minislot 1, 7-bit QAM for minislots 2-4, 5-bit QAM for minislot 5-6, and 0-bit QAM for minislots 7-8.

Figure 7B:
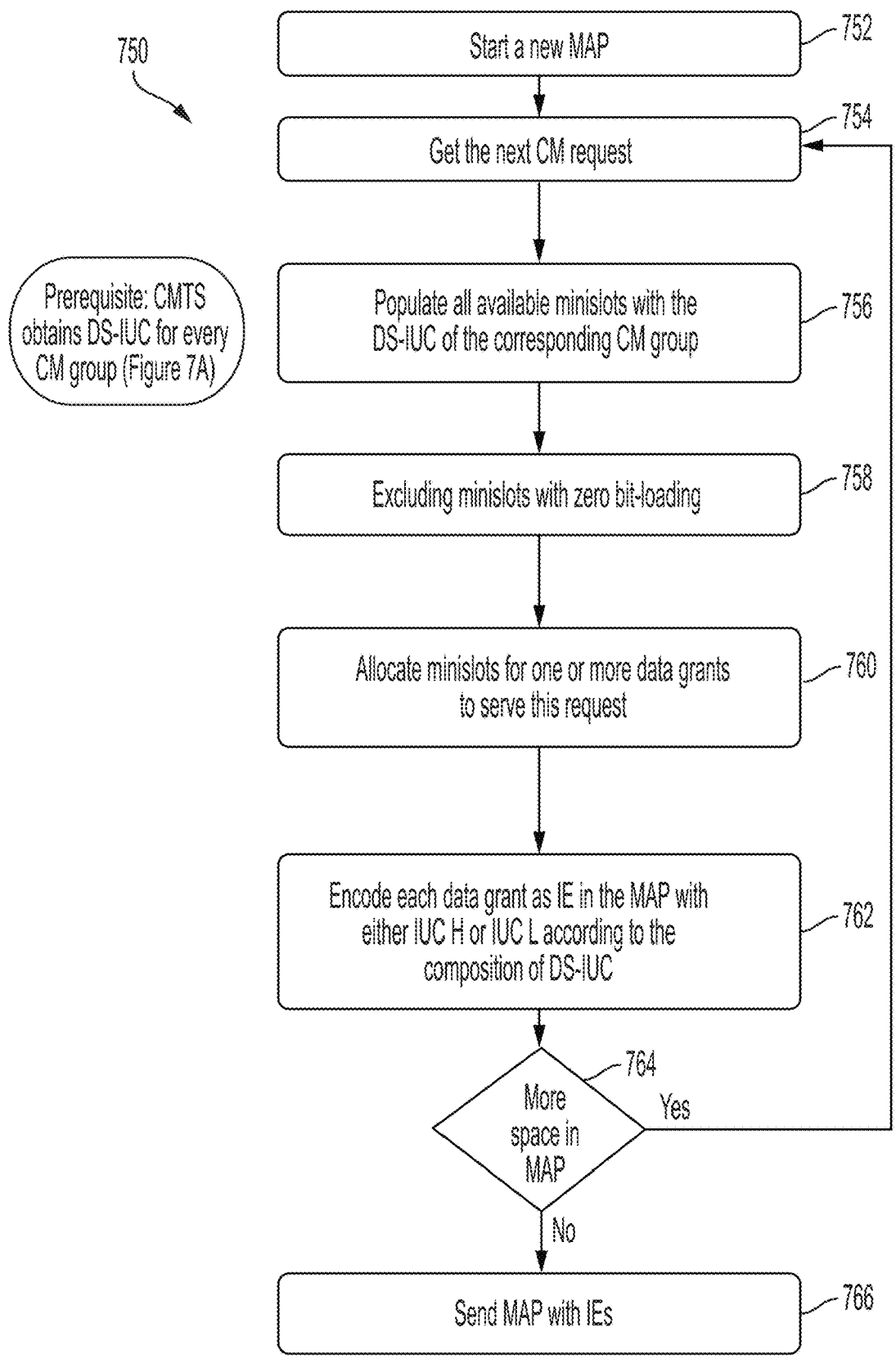
FIG. 7B shows an example of a computerized process to utilize the bit-loadings in upstream scheduler, according to some embodiments.

FIG. 7B shows an example of a computerized process 750 for the CMTS to utilize the dynamic profile. As a prerequisite prior to step 752, the CMTS can obtain a dynamic profile, such as a DS-IUC, for every CM group, as shown in FIG. 7A and explained previously. At step 752, the CMTS starts a new MAP. At step 754, the CMTS obtains the next CM request (either an explicit request, or an implicit request, such as an UGS grant). At step 756, the CMTS populates all available minislots using the bit loadings of the current dynamic profile, such as the DS-IUC, corresponding to the CM group where the CM belongs. At step 758, the CMTS excludes all minislots in NULL state per the current dynamic profile, such as the DS-IUC. At step 760, the CMTS allocates one or more data grants to serve the CM request, where the minislots contained in each grant shares the same IUC H or IUC L state according to the composition of the current dynamic profile. At step 762, the CMTS encodes each data grant as an IE using either IUC H or IUC L according to the composition of the current dynamic profile. At step 764, the CMTS determines if there is more space in the current MAP. If so, the method is proceeded back to step 754, otherwise it proceeds to step 766. At step 766, the CMTS sends the MAP with all IEs.

Refer to step 760. In some embodiments, the scheduler may encode different data information elements (IEs) in the MAP (where each IE defines a burst) of the same CM with different IUC numbers based on the current DS-IUC. Using such techniques, the bit-loading value at a particular minislot could assume that of any one of the available profiles. The collection of the available profiles can provide a tiered option to dynamically adapt the OFDM channel to noise. For example, in the case of three profiles as discussed in the example above (IUC H, IUC L and NULL), the three profiles can provide a 3-tier option for dynamic adaptation without involving the CM, and such adaptation may be different on different sub-bands.

Figure 9:
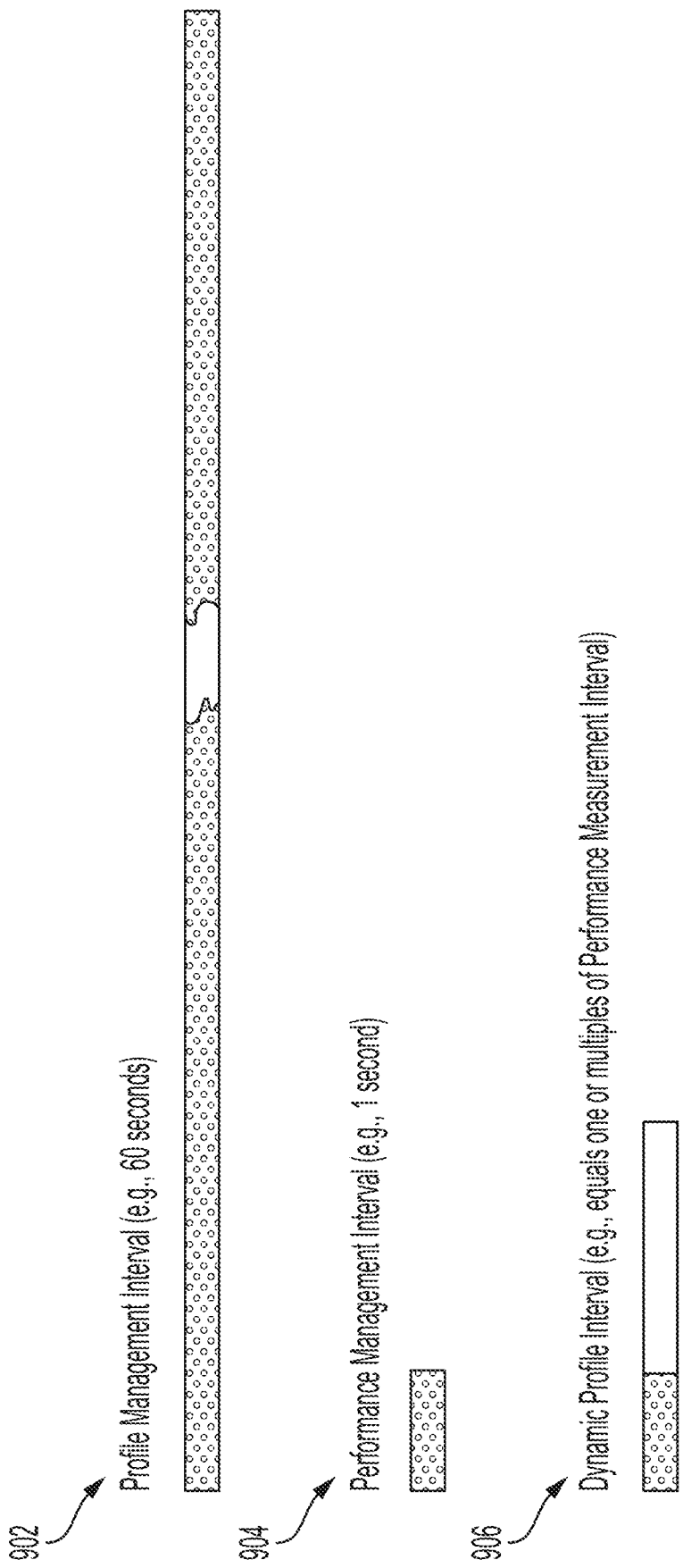
FIG. 9 is an exemplary illustration of the relationship among the profile management interval, the performance measurement interval, and the dynamic profile interval.

At each dynamic profile interval, the CMTS can evaluate the previous DS-IUC of a CM group and possibly update the bit-loadings of one or more minislots. In some embodiments, the dynamic profile interval can be related to the performance measurement interval discussed herein (e.g., it can be the same as the measurement interval, or it can be multiples of the measurement interval, etc.). Refer to FIG. 9 for an example of the relationship between the dynamic profile interval 906 and the performance measurement interval 904.

In some embodiments, the dynamic profile techniques can allow the CMTS to exclude data transmissions on severely impaired regions based on the bit loadings used for the minislots. For example, the CMTS can avoid scheduling any data transmission in certain regions, such as the region with NULL bit-loading (e.g., since there is no bit encoding permitted due to noise/interference), as shown in step 758. As another example, the CMTS can avoid scheduling initial ranging and fine ranging requests in certain regions, such as NULL regions. The scheduler can use the DS-IUC to determine appropriate minislots for data and/or ranging requests. For example, the scheduler can use the DS-IUC to determine minislots for ranging requests, and program the corresponding IEs using a ranging IUC (e.g., IUC 3 or 4) instead of a data IUC (e.g., H IUC or L IUC).

In some embodiments, the CMTS can further exclude non-data transmissions on severely impaired regions. For example, the CMTS can avoid scheduling initial ranging and fine ranging requests in severely impaired regions based on the per-minislot performance measurements. As a further example, when the currently allocated initial ranging and/or fine ranging zone become severely impaired, the CMTS can select a region with the best overall performance or the least impairment as the new initial ranging and/or fine ranging zone, again based on the per-minislot performance measurements (for example, per-minislot MER/SNR measurements). The generation of per-minislot performance measurements is discussed, for example, in conjunction with FIG. 5. The scheduler can program the corresponding IEs using a ranging IUC (e.g., IUC 3 or 4) instead of a data IUC (e.g., H IUC or L IUC). This process, not illustrated in the Figure, is referred to as dynamic ranging zone. In some embodiments, the scheduler can determine that the performance data indicates one or more of the minislots has an impairment and can schedule a non-data transmission request based on the minislot performance data to avoid scheduling the non-data transmission request in impaired minislots. The non-data transmission request can include, for example, a ranging request. The scheduler can schedule the ranging request by determining, based on the minislot performance data, that an existing ranging zone is associated with the one or more minislots with likely impairments, and determine a new ranging zone based on the performance data.

In some embodiments, the CMTS can combine the dynamic adjustment of bit loadings for individual resources with the existing profile management mechanisms, which are used to create and modify profile H and profile L. It is possible to combine the dynamic profile method with any of profile management mechanisms. As described herein, the collection of the profiles at a CM (e.g., IUC H, IUC L and NULL) provides a tier of options for dynamic adaption to noise conditions to a certain extent without involving the CM, and such adaption could be different at different subbands. The creation and modification of DS-IUC based on the current profiles (e.g., IUC H and IUC L) is performed at each dynamic profile interval, while the assignment and re-assignment of Profile H and Profile L is performed on each profile management interval. The dynamic profile interval may be chosen such that it is smaller than the profile management interval. For example, the dynamic profile interval can be sub-second to multiple seconds and the profile management interval can be sub-minute to minutes. Refer to FIG. 9 for an example of the relationship between the dynamic profile interval 906 and the profile management interval 902.

In some embodiments, the profile management mechanisms can be enhanced to provide better flexibility. For example, the lower profile of a CM can be set to a certain profile (e.g., a profile other than a common lower profile 13) after CM registration. Then, the CMTS may select a pair of high and low profiles (Profile H and Profile L) at the same time for a CM, with some various policies. For example, the CMTS may select Profile H first, and select Profile L as the lowest profile (e.g., which is typically used). As another example, the CMTS may select Profile H first, and for each possible Profile H, a Profile L may be selected as the pair to Profile H (e.g., say profile L is 3 DB lower then Profile H). As a further example, the CMTS may upgrade or downgrade Profile H and Profile L separately based on performance measures with the current Profile H and Profile L. As another example, the CMTS may select Profile H and Profile L based on a rule that at least a certain percentage of the minislots could be satisfied by Profile H, and at least another percentage of the minislots could be satisfied by Profile L.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A computerized method for dynamically scheduling individual orthogonal frequency-division multiple access (OFDMA) resources on an upstream channel to serve data transmission requests from a downstream device, the method comprising:
   generating at least two bit loading profiles for use in a dynamic schedule for set of minislots;
   determining performance data for the set of minislots based on testing the set of minislots during a measurement interval, testing comprising allocating minislots from the set of minislots into a first subset comprising testing minislots and a second subset comprising data transmission minislots, the performance data based on payloads of the first subset; and determining, based on the performance data, the dynamic schedule for the set of minislots of the plurality of available resources, wherein the dynamic schedule indicates whether to use a first bit loading profile or a second bit loading profile for each resource of the plurality of available resources to serve the data transmission requests during at least a portion of the profile management interval.

2. The method of claim 1, wherein the testing minislots comprise single-minislots.

3. The method of claim 2, wherein the testing minislots comprise payloads for data transmission.

4. The method of claim 1, wherein the set of minislots corresponds to a frame and 1% of minislots in the frame are allocated as the testing minislots.

5. The method of claim 4, wherein minislot grants allocated as testing minislots rotate across the frame.

6. The method of claim 1, further comprising grouping the downstream device into a group with a plurality of devices and collecting performance data for the set of minislots for the group.

7. The method of claim 1, further comprising allocating remaining minislots, which are unassigned after the allocation of minislots for data transmission, as additional testing minislots.

8. The method of claim 1, wherein performance data for each minislot in the set of minislots is determined at least once per frame.

9. A method for receiving data over a transmission network using a dynamic schedule for a plurality of Orthogonal Frequency-Division Multiple Access (OFDMA) minislots, the method comprising:

generating at least two bitloading profiles for the plurality of OFDMA minislots;

allocating minislots from the plurality of OFDMA minislots among a first subset comprising testing minislots and a second subset comprising data transmission minislots;

measuring performance data for the plurality of OFDMA minislots using payloads of the testing minislots;

using the performance data to dynamically schedule data transmission over the network using a selected bitloading profile from the at least two bitloading profiles, the selected bitloading profile using the plurality of OFDMA minislots; and receiving data over the transmission network according to the schedule.

* * * * *